United States Patent
Zhao (10) Patent No.: US 9,276,514 B2
(45) Date of Patent: Mar. 1, 2016

(54) FAN MOTOR

(71) Applicants: ZHONGSHAN BROAD-OCEAN MOTOR CO., LTD., Zhongshan (CN); HUBEI QUEEN-OCEAN ELECTRICAL APPLIANCE MANUFACTURE CO., LTD., Xiaogan (CN)

(72) Inventor: Yong Zhao, Zhongshan (CN)

(73) Assignees: ZHONGSHAN BROAD-OCEAN MOTOR CO., LTD., Zhongshan (CN); HUBEI QUEEN-OCEAN ELECTRICAL APPLIANCE MANUFACTURE CO., LTD., Xiaogan (CN)

( * ) Notice: Subject to any disclaimer, the term of this patent is extended or adjusted under 35 U.S.C. 154(b) by 364 days.

(21) Appl. No.: 13/844,836

(22) Filed: Mar. 16, 2013

(65) Prior Publication Data

US 2014/0062376 A1 Mar. 6, 2014

(30) Foreign Application Priority Data

Aug. 31, 2012 (CN) .......................... 2012 2 0445126

(51) Int. Cl.
*H02P 1/00* (2006.01)
*H02P 3/00* (2006.01)
*H02P 23/00* (2006.01)

(52) U.S. Cl.
CPC ................................. *H02P 23/0004* (2013.01)

(58) Field of Classification Search
USPC .......... 318/800, 703, 471, 504, 708; 310/156, 310/179
See application file for complete search history.

(56) References Cited

U.S. PATENT DOCUMENTS

| | | | | |
|---|---|---|---|---|
| 4,623,798 A * | 11/1986 | Arai et al. | ...................... | 307/117 |
| 4,757,241 A * | 7/1988 | Young | ...................... | 318/400.13 |
| 5,180,440 A * | 1/1993 | Siegel et al. | .................. | 136/230 |
| 5,197,858 A * | 3/1993 | Cheng | ............................. | 417/14 |
| 5,769,705 A * | 6/1998 | O'Callaghan et al. | ......... | 454/184 |
| 6,204,623 B1* | 3/2001 | Levy et al. | ..................... | 318/641 |
| 2003/0091441 A1* | 5/2003 | Huang et al. | .................... | 417/42 |
| 2005/0243482 A1* | 11/2005 | Lee | ................................. | 361/33 |
| 2009/0119036 A1* | 5/2009 | Jayanth et al. | .................. | 702/60 |
| 2009/0136220 A1* | 5/2009 | Jeung | ............................. | 388/806 |
| 2009/0164154 A1* | 6/2009 | Ishikawa et al. | ................ | 702/63 |
| 2010/0060218 A1* | 3/2010 | Woodward | ............... | 318/400.15 |
| 2010/0060256 A1* | 3/2010 | Ishikawa et al. | ........... | 324/76.11 |
| 2011/0018473 A1* | 1/2011 | Rockenfeller et al. | .......... | 318/51 |
| 2012/0120987 A1* | 5/2012 | Torti et al. | ..................... | 374/183 |
| 2012/0229064 A1* | 9/2012 | Jeung | ........................ | 318/400.13 |

* cited by examiner

*Primary Examiner* — Paul Ip
*Assistant Examiner* — Devon Joseph
(74) *Attorney, Agent, or Firm* — Matthias Scholl, PC; Matthias Scholl (57) ABSTRACT

A fan motor, including: a variable speed motor and a motor controller. The motor controller includes: a microprocessor, an inverter unit, a gear detection unit, and a power supply unit. The power supply unit supplies power for each circuit. The gear detection unit is connected to a plurality of power input lines. Each power input line receives AC power from an AC power supply. The gear detection unit includes: a plurality of voltage detection circuits, and a plurality of thermal resistors. Each power input line is connected to a thermal resistor in series and matches up with a voltage detection circuit. Each voltage detection circuit includes a thermo-sensitive resistor that is bound to the corresponding thermal resistor via a thermal conductive element. The thermo-sensitive resistor detects a temperature signal of the thermal resistor and adjusts the voltage of the output end of the voltage detection circuit.

13 Claims, 7 Drawing Sheets

FAN MOTOR

CROSS-REFERENCE TO RELATED APPLICATIONS

Pursuant to 35 U.S.C. §119 and the Paris Convention Treaty, this application claims the benefit of Chinese Patent Application No. 201220445126.6 filed Aug. 31, 2012, the contents of which are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a fan motor which is mainly used in civil heating and ventilation air-conditioning (HVAC) systems.

2. Description of the Related Art

The improvement of the efficiency of HVAC systems reduces energy consumption greatly. For example, the utilization efficiency of many high-efficient stoves, air conditioners, and air cleaners (AFUE rated value) now is above 90%. However, the efficiency of fan motors which are used to move the air in these systems doesn't improve obviously yet and is too low. As the total energy consumption of HVAC systems which belong to fan motors increases when the stoves and air conditioners are more efficient, the fan motors become larger contributors of the whole systems in terms of energy consumption.

The reason of the low efficiency is that the fan motors of HVAC systems are fixed-speed or multi-speed permanent-split capacitor (PSC) motors. These motors usually have at least two independent power connectors which are used to demodulate the heating or cooling mode of operation. The heating or cooling power input end is usually connected to different winding taps of the PSC motors, which can provide different operating speeds to some extent for different operational modes.

The PSC motor can be designed to have more than two taps, which allows OEMs (original equipment manufacturers) or installation mechanics to choose operating speeds by connecting the taps to heating or cooling power connecting wire respectively. The electric energy of these AC power connecting wires connected to the motor can be controlled by a temperature switch; the relays are driven by a thermostatic controller.

Figure 1:
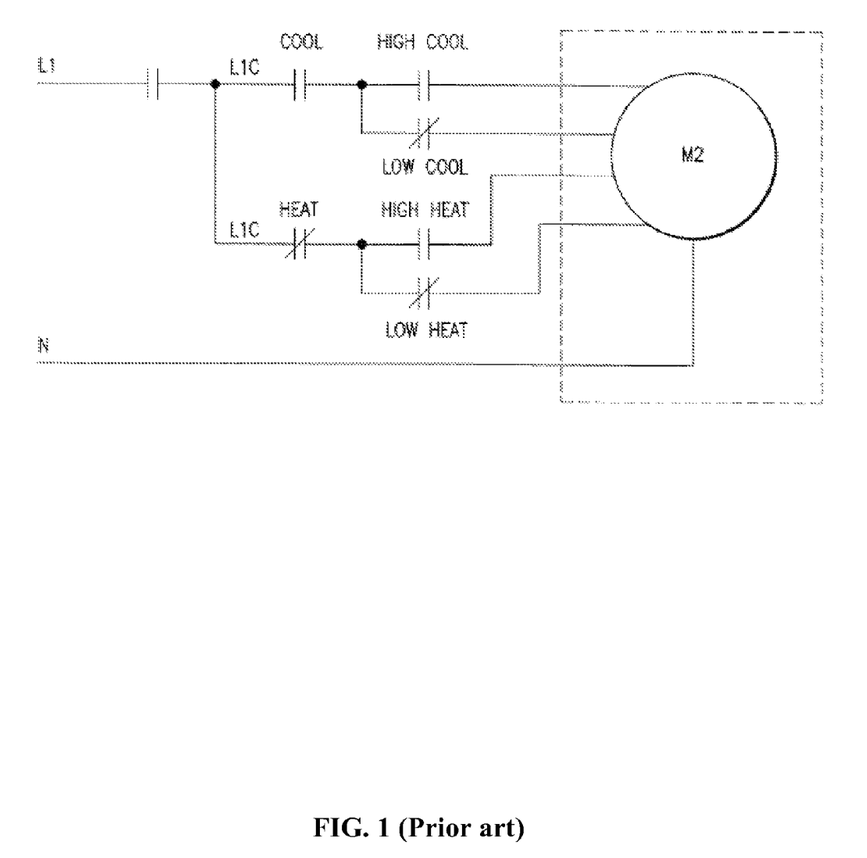
FIG. 1 is a circuit diagram of a PSG motor in a traditional HVAC system.
Figure 2:
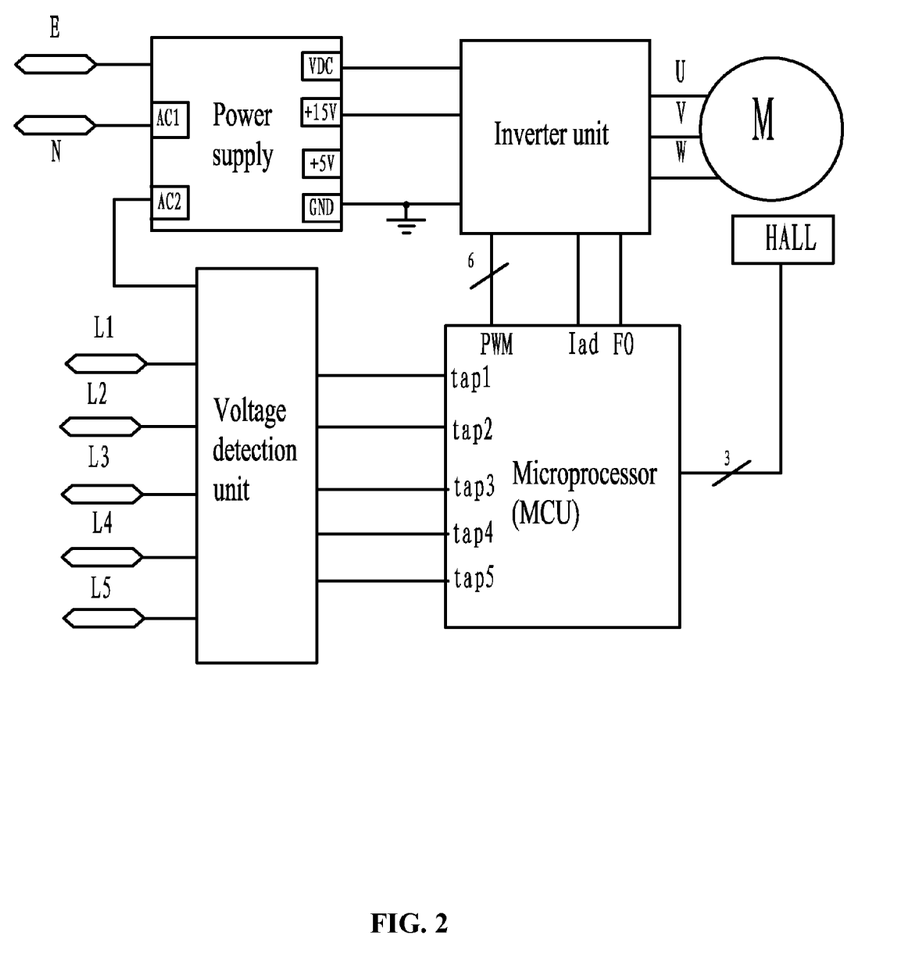
FIG. 2 is a circuit block diagram of a fan motor of the invention in accordance with Example 1.

FIG. 1 shows other fixed speed PSC motors used for civil HVAC systems. The motor has four winding taps to demodulate the speeds of two heating fans and two cooling fans. The speeds of the fans are controlled by a stove control panel which has a cooling/heating relay, a high/low cooling relay and a high/low heating relay. Other HVAC systems consist of two heating stages and a single cooling stage, or some other combinations of heating and cooling revolving speeds.

When operating at a high speed, the PSC motor is reasonably efficient; when operating at a low speed, its efficiency can lower to within 20%. As the air flow needed by the evaporator coil of the air conditioner is faster than that of the heat exchanger of the stove, the efficiency of the fan motor running at a lower speed is low during the period of the operation of the stoves. During the period of continuous operation of the fan, the efficiency of the fan motor is lowest when it is still running at a lower speed.

Due to the low efficiency of the PSC motors, many updated HVAC systems apply variable speed motors such as brushless permanent-magnet motors (BPM) and corresponding variable speed motors with electronic controllers. The revolving speed of BPM can be controlled by electronic components, which is especially set to produce required air flow matching with each application. In addition, the power consumption of BMP is about in direct proportion to the cube of the motor speed, and the electrical work of the PSC motors is about in direct proportion to the motor speed. Hence, when the motor speed drops, the electrical work of BPM within the whole scope of motor speed is lower than that of BPM. As mentioned above, this is especially important when the fan runs continuously and repeatedly.

Variable speed motors are superior to PSC motors. To replace the existing PSC motors by variable motors, complicated changes in production cost, time consumption, machinery, wiring or system control configuration is necessitated. The variable motors which are used to replace the PSC motors in the existing HVAC systems have been developed already, but their control and sensing systems are relatively complex. In other alternative systems, to install alternative motors needs to supply continuous electrical power to the motors and directly send the lower-voltage control signals of the thermostatic controllers to the motors. It is very difficult to make these connecting wires in the existing HVAC systems. In addition, these systems known in the art are lack of sensitivity to the fan motors running at a low speed.

The restrictions of the existing PSC motors and BPM are that HVAC OEMs often need to configure motors with sole parameters (the torque load, the fan speed, the direction of rotation, etc.) and optimize the performance of HVAC components. Variable speed PSC motors and BPM provide some options; many operational parameters are set after manufacturing and are difficult to change. Therefore, motor manufacturers, installation mechanics and maintenance contractors have to have all kinds of stocks of fan motors to demodulate different modes of HVAC equipment.

Hence, it is hoped to provide an imbedded improved substitute for the PSC motors of the HVAC system which has advantages of the variable motors but doesn't change the original HVAC system obviously. More important is that it lowers the complexity of such alternative systems by using simple control circuits and cancels additional arrangements of wires which are usually used in connecting the regular variable speed motors and the existing alternative variable speed motors. Consequently, higher requirements are set on variable speed fan motors.

SUMMARY OF THE INVENTION

In view of the above-described problems, it is one objective of the invention to provide a fan motor. The invention employs a variable speed motor which is electronically controlled by a motor controller to substitute the original PSC motor, and features in simplified wiring, no necessary in changing the original HVAC system, time saving, lower production cost, simplified circuit, simple manufacturing procedures, and reduced controller size.

To achieve the above objective, in accordance with one embodiment of the invention, there is provided a fan motor comprising: a variable speed motor, and a motor controller. The motor controller comprises: a microprocessor, an inverter unit, a gear detection unit, and a power supply unit. The power supply unit supplies power for each circuit. The gear detection unit is connected with a plurality of power input lines. Each power input line receives AC power from an AC power supply. The gear detection unit comprises: a plurality of voltage detection circuits, and a plurality of thermal resistors. Every power input line is connected to a thermal resistor in series and matches up a voltage detection circuit. Each voltage detection circuit comprises a thermo-sensitive resistor that is bound to the corresponding thermal resistor via a thermal conductive element. The thermo-sensitive resistor detects a temperature signal of the thermal resistor and adjusts a voltage of an output end of the voltage detection circuit by changing a resistance value itself. Output ends of a plurality of the voltage detection circuits are connected to an input end of the microprocessor. The microprocessor determines a power-on state of each power input line according to the output end voltage of each voltage detection circuit.

In a class of this embodiment, the thermal conductive element is a thermal conductive adhesive. The thermal resistor and the thermo-sensitive resistor are arranged on the circuit board next to each other and are both wrapped by the thermal conductive adhesive.

In a class of this embodiment, the thermal conductive element is a metal component comprising an insulating film.

In a class of this embodiment, each voltage detection circuit comprises: a thermo-sensitive resistor, and a divider resistor. Two ends of a series connection of the thermo-sensitive resistor and the divider resistor are connected to the power supply and the ground, respectively. A nodal point between the thermo-sensitive resistor and the divider resistor acts as a voltage output end.

In a class of this embodiment, the microprocessor is also connected with a HALL detection unit. The HALL detection unit sends a signal of a rotator position to the microprocessor. The microprocessor sends out a signal to control the inverter unit. An output end of the inverter unit is connected to a motor winding.

In a class of this embodiment, five power input lines, five voltage detection circuits, and five thermal resistors are provided.

In a class of this embodiment, the thermo-sensitive resistor is a PTC resistor or a NTC resistor.

Advantages of the invention are summarized as follows:
1) The invention employs the variable speed motor which is electronically controlled by a motor controller to substitute the original PSC motor, and features in simplified wiring, no necessary in changing the original HVAC system, time saving, lower cost in research. The gear detection unit comprises five voltage detection circuits and five thermal resistors. Each power input line is connected to a thermal resistor in series and matches up a voltage detection circuit. Each voltage detection circuit comprises the thermo-sensitive resistor which is bound with the thermal resistor by the thermal conductive element. The resistance values of the thermal resistor change with the temperature variation of the thermal resistor. The microprocessor determines which one is in a power-on state by comparing the five output voltage values of the five voltage detection circuits. The circuit has a simple and reliable structure, easy manufacturing procedure and low manufacturing cost.
2) Every power input line is connected to a thermal resistor in series and matches up a voltage detection circuit. Each voltage detection circuit comprises a thermo-sensitive resistor that is bound to the corresponding thermal resistor via a thermal conductive element. Thus, the circuit is simple, and a small volume of the controller can be realized.
3) The thermal conductive element is a thermal conductive adhesive. The thermal resistor and the thermo-sensitive resistor are arranged on the circuit board next to each other, which are both wrapped by the thermal conductive adhesive. Thus, the structure is simplified and practicable.
4) Each voltage detection circuit comprises: a thermo-sensitive resistor, and a divider resistor. Two ends of a series connection of the thermo-sensitive resistor and the divider resistor are connected to the power supply and the ground, respectively. The nodal point between the thermo-sensitive resistor and the divider resistor acts as a voltage output end. Thus, the circuit structure is simplified, and the production cost is lowered.

DETAILED DESCRIPTION OF THE EMBODIMENTS

To further illustrate the invention, experiments detailing the preparation of a fan motor are described below. It should be noted that the following examples are intended to describe and not to limit the invention.

Example 1

Figure 3:
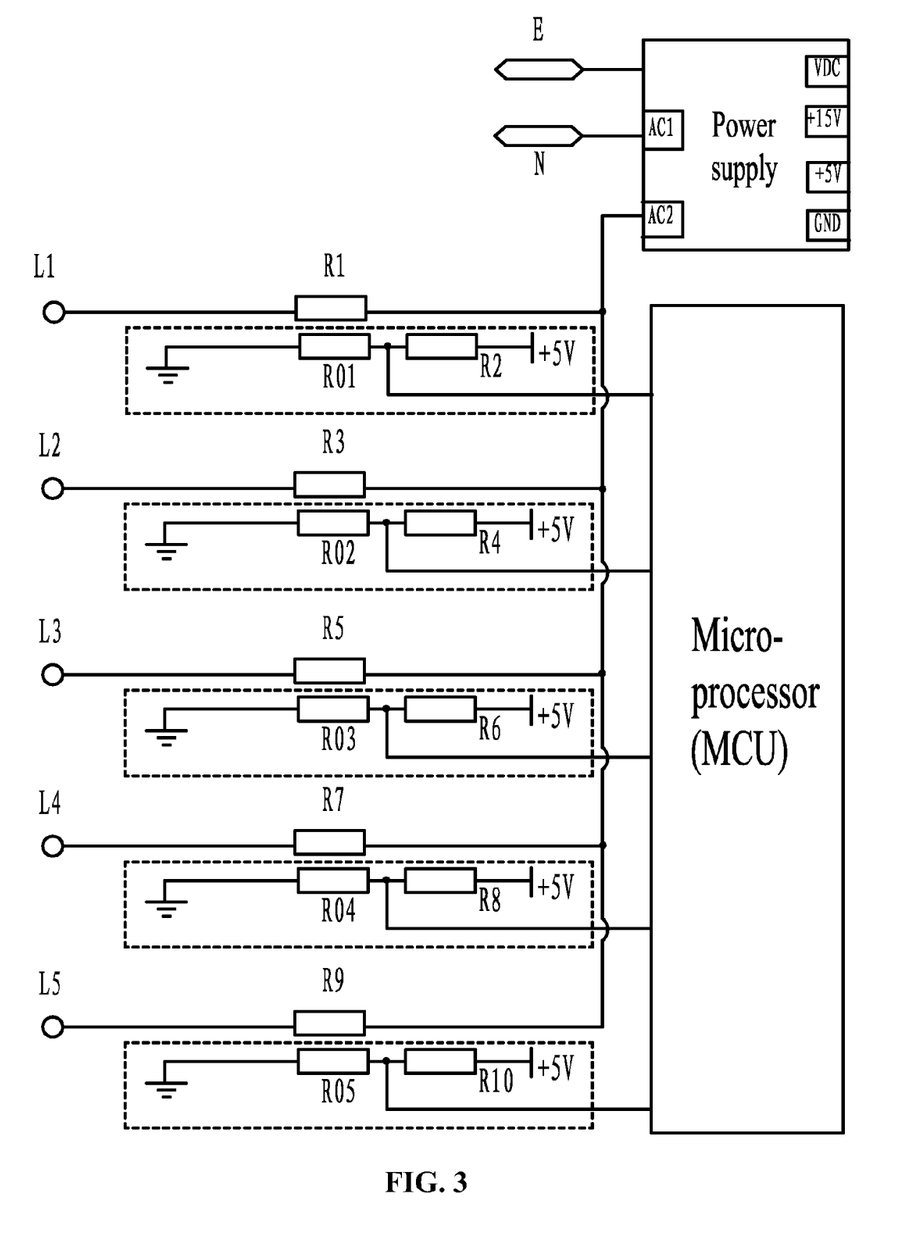
FIG. 3 is a specific circuit diagram of a gear detection unit of FIG. 2.

As shown in FIGS. 2-5, a fan motor comprises: a variable speed motor, and a motor controller. The motor controller comprises: a microprocessor, an inverter unit, a voltage detection unit, and a power supply unit. The power supply unit supplies power for each circuit. The voltage detection unit 5 is connected to five power input lines L1, L2, L3, L4, and L5 which all receive AC power from an AC power supply. The voltage detection unit comprises five voltage detection circuits and five thermal resistors R1, R3, R5, R7, and R9. The microprocessor is also connected to a HALL detection unit which sends a position signal of a rotor to the microprocessor. The microprocessor sends out a signal to control the inverter unit whose output end is connected to a motor winding. In FIG. 3, E represents a ground wire, N represents a null wire. The power input lines L1, L2, L3, L4 and L5 are live wires, only one of the power input lines is on a conducting state. One input end of the power supply is connected to the power input lines L1, L2, L3, L4 and L5; the other input end of the power supply unit is connected to the null wire N. The power supply unit comprises: an EMI/EMC circuit, a rectifier circuit, and a DC-DC step-down circuit. Three sets of output ends are provided, of them, one set is a motor bus voltage VDC, one set is +15V, and the last is +5V.

Figure 4:
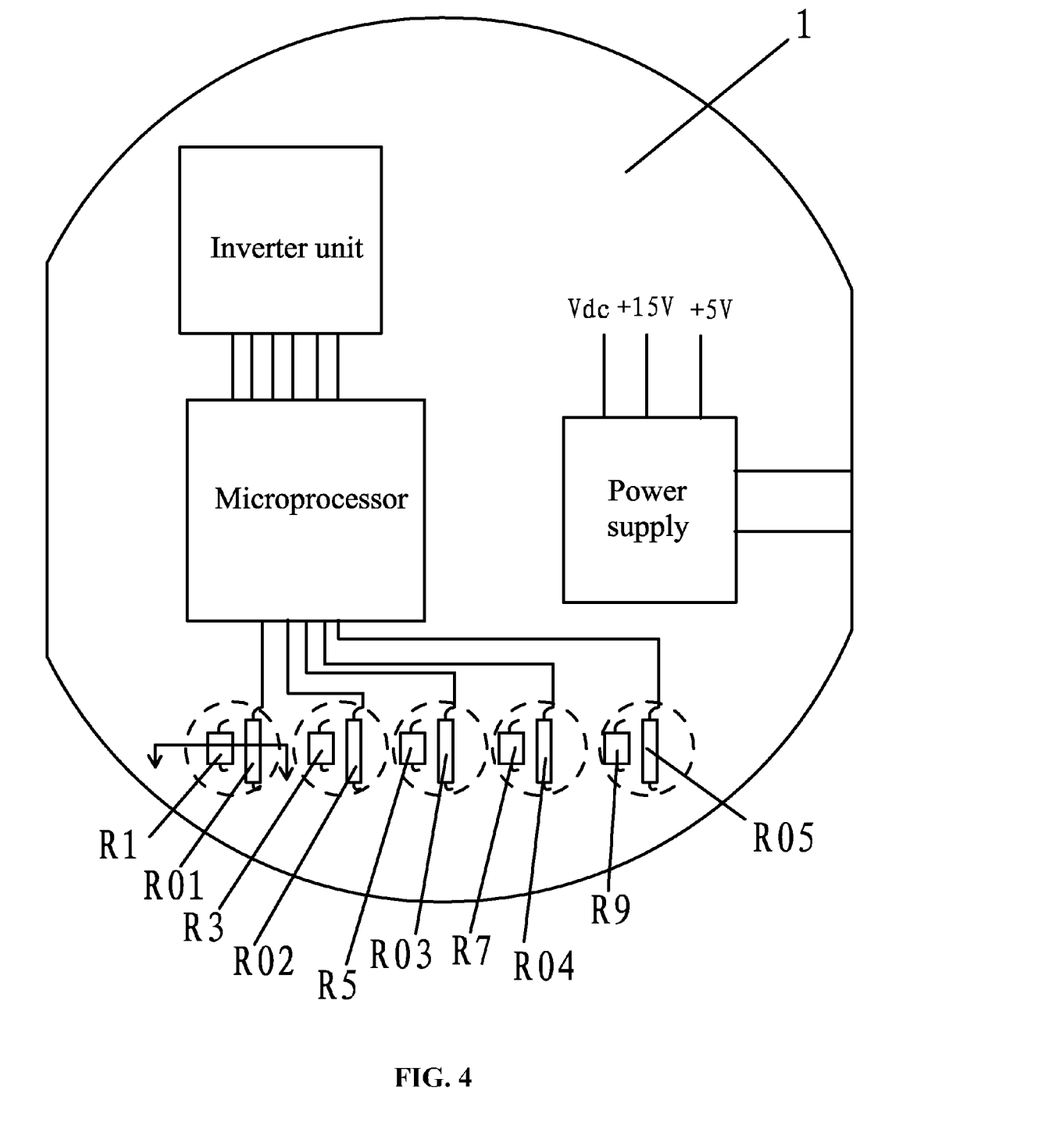
FIG. 4 is an arrangement diagram of the circuit board in accordance with Example 1.
Figure 5:
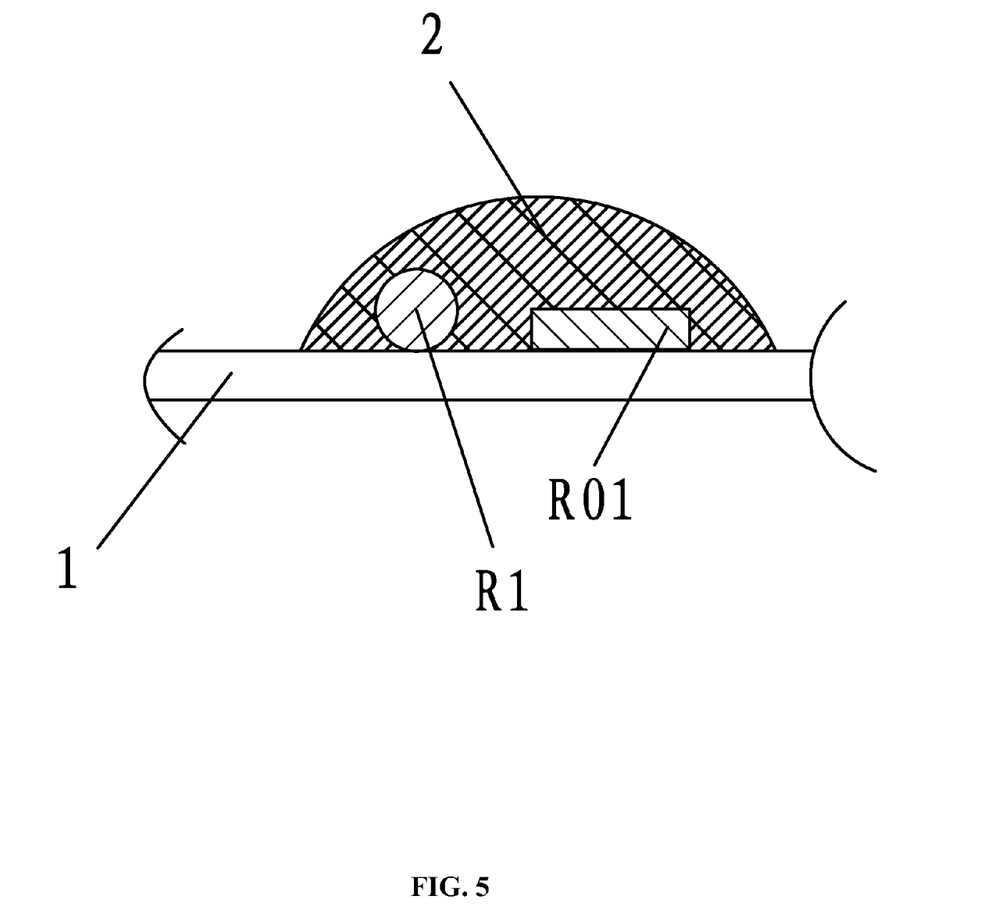
FIG. 5 is a cross-sectional view taken from line A-A of FIG. 4.

The first voltage detection circuit comprises a thermo-sensitive resistor R01 and a resistor R2 which are series connected, two ends of the circuit are connected to a +5V power supply and the ground, respectively. A nodal point between the thermo-sensitive resistor R01 and the resistor R2 acts as an output end of the first voltage detection circuit and is connected to an output end of the microprocessor. A thermal resistor R1 is connected to the power input line L1 in series. The thermal resistor R1 and the thermo-sensitive resistor R01 are arranged on the circuit board 1 close to each other. The thermal resistor R1 and the thermo-sensitive resistor R01 are bound together by a thermal conductive element 2. The thermal conductive element 2 is an insulating thermal conductive adhesive which wraps the thermal resistor R1 and thermo-sensitive resistor R01. The thermo-sensitive R01 detects a temperature signal of the thermal resistor R1, and adjusts a voltage of the output end of the first voltage detection circuit by changing its own resistance value. The thermal resistor R1 and the thermo-sensitive resistor R01 are arranged next to each other on the circuit board 1.

The second voltage detection circuit comprises a thermo-sensitive resistor R02 and a resistor R4 which are series connected, two ends of the circuit are connected to a +5V power supply and the ground, respectively. A nodal point between the thermo-sensitive resistor R02 and the resistor R4 acts as an output end of the first voltage detection circuit and is connected to the output end of the microprocessor. A thermal resistor R3 is connected to the power input line L2 in series. The thermal resistor R3 and the thermo-sensitive resistor R02 are arranged on the circuit board 1 close to each other. The thermal resistor R3 and the thermo-sensitive resistor R02 are bound together by a thermal conductive element (not shown in FIGS.). The thermal conductive element is an insulating thermal conductive adhesive which wraps the thermal resistor R3 and thermo-sensitive resistor R02. The thermo-sensitive R02 detects a temperature signal of the thermal resistor R3, and adjusts a voltage of the output end of the second voltage detection circuit by changing its own resistance value. The thermal resistor R3 and the thermo-sensitive resistor R02 are arranged next to each other on the circuit board 1.

The third voltage detection circuit comprises a thermo-sensitive resistor R03 and a resistor R6 which are series connected, two ends of the circuit are connected to a +5V power supply and the ground, respectively. A nodal point between the thermo-sensitive resistor R03 and the resistor R6 acts as an output end of the first voltage detection circuit and is connected to the output end of the microprocessor. A thermal resistor R5 is connected to the power input line L3 in series. The thermal resistor R5 and the thermo-sensitive resistor R03 are arranged on the circuit board 1 close to each other. The thermal resistor R5 and the thermo-sensitive resistor R03 are bound together by a thermal conductive element (not shown in FIGS.). The thermal conductive element is an insulating thermal conductive adhesive which wraps the thermal resistor R5 and thermo-sensitive resistor R03. The thermo-sensitive R03 detects a temperature signal of the thermal resistor R5, and adjusts a voltage of the output end of the third voltage detection circuit by changing its own resistance value. The thermal resistor R5 and the thermo-sensitive resistor R03 are arranged next to each other on the circuit board 1.

The fourth voltage detection circuit comprises a thermo-sensitive resistor R04 and a resistor R8 which are series connected, two ends of the circuit are connected to a +5V power supply and the ground, respectively. A nodal point between the thermo-sensitive resistor R04 and the resistor R8 acts as an output end of the first voltage detection circuit and is connected to the output end of the microprocessor. A thermal resistor R7 is connected to the power input line L4 in series. The thermal resistor R7 and the thermo-sensitive resistor R04 are arranged on the circuit board 1 close to each other. The thermal resistor R7 and the thermo-sensitive resistor R04 are bound together by a thermal conductive element (not shown in FIGS.). The thermal conductive element is an insulating thermal conductive adhesive which wraps the thermal resistor R7 and thermo-sensitive resistor R04. The thermo-sensitive R04 detects a temperature signal of the thermal resistor R7, and adjusts a voltage of the output end of the fourth voltage detection circuit by changing its own resistance value. The thermal resistor R7 and the thermo-sensitive resistor R04 are arranged next to each other on the circuit board 1.

The fifth voltage detection circuit comprises a thermo-sensitive resistor R05 and a resistor R10 which are series connected, two ends of the circuit are connected to a +5V power supply and the ground, respectively. A nodal point between the thermo-sensitive resistor R05 and the resistor R10 acts as an output end of the first voltage detection circuit and is connected to the output end of the microprocessor. A thermal resistor R9 is connected to the power input line L5 in series. The thermal resistor R9 and the thermo-sensitive resistor R05 are arranged on the circuit board 1 close to each other. The thermal resistor R9 and the thermo-sensitive resistor R05 are bound together by a thermal conductive element (not shown in FIGS.). The thermal conductive element is an insulating thermal conductive adhesive which wraps the thermal resistor R9 and thermo-sensitive resistor R05. The thermo-sensitive R05 detects a temperature signal of the thermal resistor R9, and adjusts a voltage of the output end of the fifth voltage detection circuit by changing its own resistance value. The thermal resistor R9 and the thermo-sensitive resistor R05 are arranged next to each other on the circuit board 1.

The thermal conductive element 2 can be a metal component comprising an insulating film.

Figure 6:
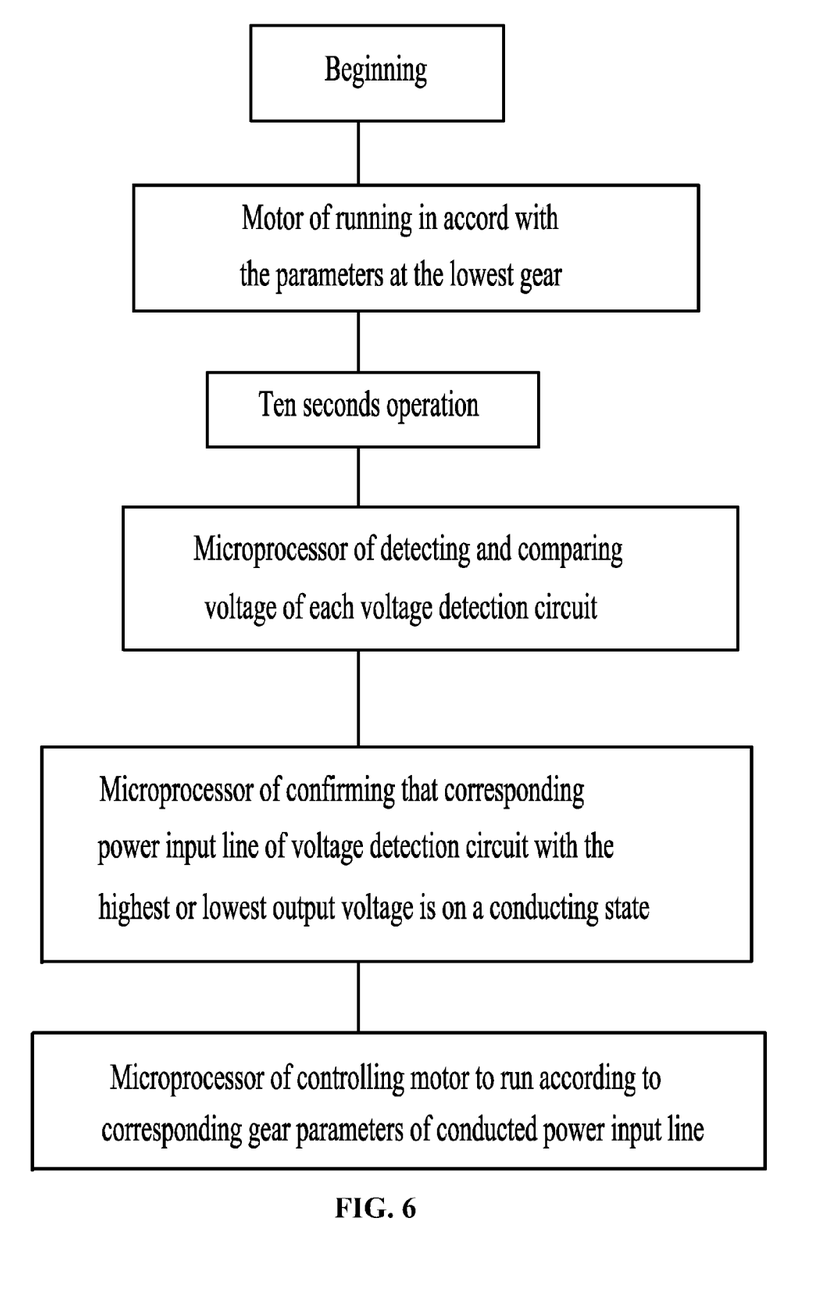
FIG. 6 is a control flow chart of a microprocessor in accordance with Example 1.

According to the output end voltage of the corresponding voltage detection circuit of every power input line, the microprocessor determines whether this power input line is power-on. The specific process is as follows: as shown in FIG. 6, at the beginning, the microprocessor of the mortar controller controls the motor to run in accord with the parameters at a lowest gear; after ten seconds operation, the microprocessor detects and compares the voltage of each voltage detection circuit, and confirms that the corresponding power input line of voltage detection circuit with the highest or lowest output voltage is on a conducting state; the microprocessor controls the motor to run according to the corresponding gear parameters of the conducted power input line.

Working principle of the invention is summarized as follows: the gear detection unit comprises five voltage detection circuits and five thermal resistors. Each power input line is connected to a thermal resistor in series and matches up with a voltage detection circuit. Each voltage detection circuit comprises a thermo-sensitive resistor. The thermal resistor, which is connected to each power input line in series, and the corresponding thermo-sensitive resistor of the voltage detection circuit are bound together. The resistance value of the thermo-sensitive resistor changes with the temperature variation of the thermal resistor. The microprocessor determines which one is power-on by comparing the five output voltages of the five voltage detection circuits. The circuit has a simple and reliable structure, low manufacturing cost, and is easy to manufacture.

Example 2

Figure 7:
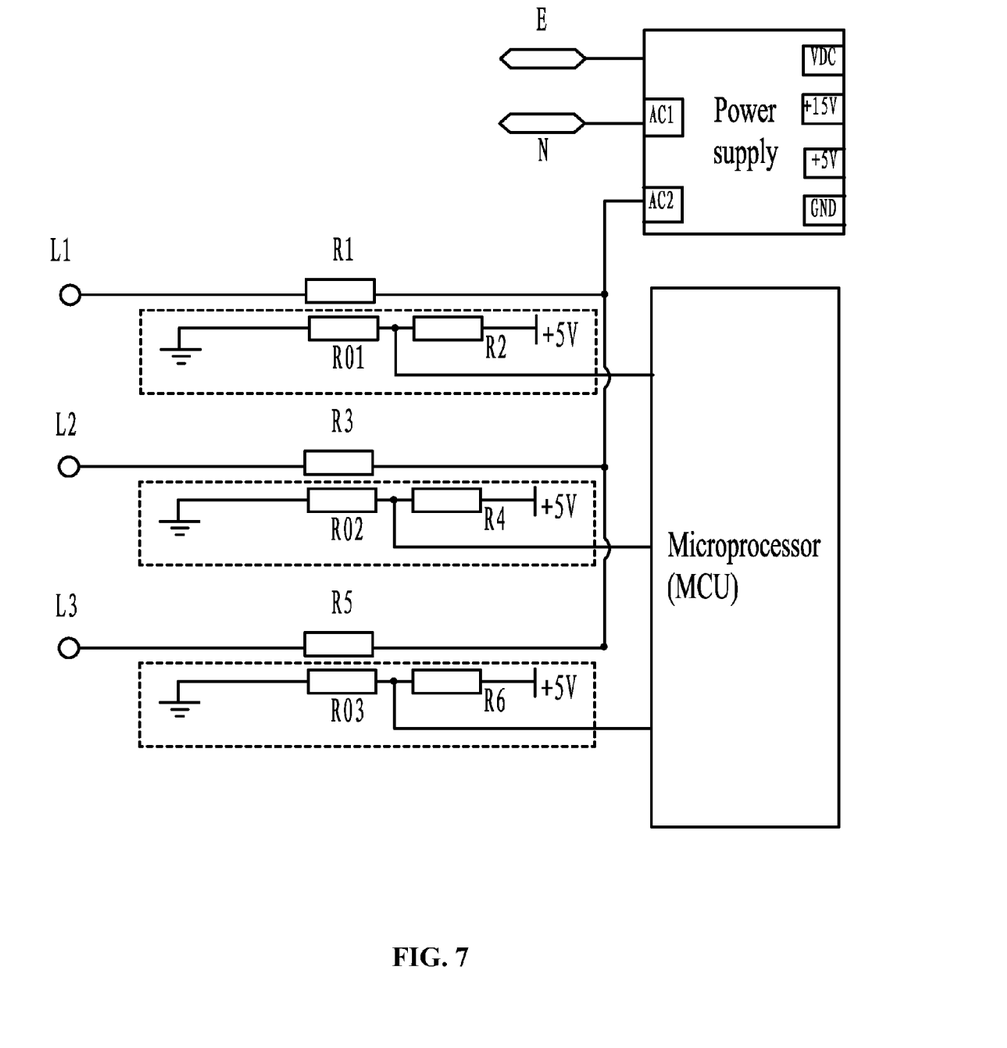
FIG. 7 is a circuit structure diagram of the invention in accordance with Example 2.

As showed in FIG. 7, Example 2 is different from Example 1 in that, the gear detection unit of Example 2 comprises: three voltage detection circuits, and three thermal resistors R1, R2, and R5. The gear detection unit is connected to three power input lines L1, L2, and L3. Each power input line receives AC power from an AC power supply. The gear detection unit comprises three voltage detection circuits and three thermal resistors R1, R2, and R5. E represents a ground wire, and N represents a null wire. The power input lines L1, L2, and L3 are live wires, only one of which is on a conducting state.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A fan motor, comprising:
   a) a variable speed motor; and
   b) a motor controller, the motor controller comprising: a microprocessor, an inverter unit, a voltage detection unit, a plurality of power input lines, and a power supply unit;
   wherein:
   the power supply unit supplies power for the microprocessor, the inverter unit, and the voltage detection unit;
   the voltage detection unit is connected with the plurality of power input lines; and each power input line is adapted to receive AC power from an AC power supply;
   the voltage detection unit comprises: a plurality of voltage detection circuits, and a plurality of thermal resistors;
   every power input line is connected to one of the plurality of thermal resistors in series;
   each voltage detection circuit comprises a thermo-sensitive resistor; and the thermo-sensitive resistor is bound to the corresponding thermal resistor via a thermally-conductive and electrically-insulating element;
   the thermo-sensitive resistor is not electrically connected to the thermal resistor;
   the thermo-sensitive resistor is adapted to change a resistance value of the thermo-sensitive resistor and a voltage of an output end of the voltage detection circuit in response to a temperature signal of the thermal resistor;
   output ends of the plurality of the voltage detection circuits are connected to an input end of the microprocessor; and
   the microprocessor determines a power-on state of each power input line according to the output end voltage of each voltage detection circuit.

2. The fan motor of claim 1, wherein
   the thermally-conductive and electrically insulating element is a thermally-conductive and electrically insulating adhesive; and
   the thermal resistor and the thermo-sensitive resistor are arranged on the circuit board next to each other and are both wrapped by the thermally-conductive and electrically insulating adhesive.

3. The fan motor of claim 1, wherein the thermally-conductive and electrically insulating element is a metal component comprising an insulating film.

4. The fan motor of claim 1, wherein
   each voltage detection circuit further comprises a divider resistor;
   two ends of a series connection of the thermo-sensitive resistor and the divider resistor are connected to a DC power supply and the ground, respectively; and
   a nodal point between the thermo-sensitive resistor and the divider resistor acts as a voltage output end.

5. The fan motor of claim 2, wherein
   each voltage detection circuit further comprises a divider resistor;
   two ends of a series connection of the thermo-sensitive resistor and the divider resistor are connected to a DC power supply and the ground, respectively; and
   a nodal point between the thermo-sensitive resistor and the divider resistor acts as a voltage output end.

6. The fan motor of claim 3, wherein
   each voltage detection circuit further comprises a divider resistor;
   two ends of a series connection of the thermo-sensitive resistor and the divider resistor are connected to a DC power supply and the ground, respectively; and
   a nodal point between the thermo-sensitive resistor and the divider resistor acts as a voltage output end.

7. The fan motor of claim 1, wherein
   the microprocessor is also connected with a HALL detection unit;
   the HALL detection unit sends a signal of a rotator position to the microprocessor;
   the microprocessor sends out a signal to control the inverter unit; and
   an output end of the inverter unit is connected to a motor winding.

8. The fan motor of claim 2, wherein
   the microprocessor is also connected with a HALL detection unit;
   the HALL detection unit sends a signal of a rotator position to the microprocessor;
   the microprocessor sends out a signal to control the inverter unit; and
   an output end of the inverter unit is connected to a motor winding.

9. The fan motor of claim 3, wherein
   the microprocessor is also connected with a HALL detection unit;
   the HALL detection unit sends a signal of a rotator position to the microprocessor;
   the microprocessor sends out a signal to control the inverter unit; and
   an output end of the inverter unit is connected to a motor winding.

10. The fan motor of claim 1, wherein five power input lines, five voltage detection circuits, and five thermal resistors are provided.

11. The fan motor of claim 2, wherein five power input lines, five voltage detection circuits, and five thermal resistors are provided.

12. The fan motor of claim 3, wherein five power input lines, five voltage detection circuits, and five thermal resistors are provided.

13. The fan motor of claim 1, wherein the thermo-sensitive resistor is a PTC resistor or a NTC resistor.

* * * * *